United States Patent [19]
Tachikake et al.

[11] Patent Number: 5,495,677
[45] Date of Patent: Mar. 5, 1996

[54] DIGITAL DISPLAY MICROMETER GAUGE

[75] Inventors: Masahiko Tachikake; Masamichi Suzuki, both of Kawasaki, Japan

[73] Assignee: Mitutoyo Corporation, Tokyo, Japan

[21] Appl. No.: 313,833

[22] Filed: Sep. 28, 1994

[30] Foreign Application Priority Data

Oct. 1, 1993 [JP] Japan .................. 5-246850

[51] Int. Cl.$^6$ ..................................... G01B 3/18
[52] U.S. Cl. .................. 33/784; 33/815; 33/819
[58] Field of Search ................ 33/706, 707, 712, 33/783, 784, 787, 813, 815, 816, 819, 831; 356/373; 324/662; 250/237.6

[56] References Cited

U.S. PATENT DOCUMENTS

| | | | |
|---|---|---|---|
| 797,745 | 8/1905 | Pitman | 33/815 |
| 2,545,782 | 3/1951 | Hugin | 33/815 |
| 4,419,824 | 12/1983 | Oberhans | 33/813 |
| 4,485,556 | 12/1984 | Sakata et al. | 33/813 |
| 4,550,507 | 11/1985 | Nishikata | 33/831 |
| 4,578,868 | 4/1986 | Sasaki et al. | 33/819 |
| 4,793,071 | 12/1988 | Steinseifer et al. | 33/786 |
| 5,026,164 | 6/1991 | Ichikawa | 356/373 |
| 5,053,715 | 10/1991 | Andermo | 324/662 |

FOREIGN PATENT DOCUMENTS

| | | | |
|---|---|---|---|
| 59-180401 | 10/1984 | Japan | 33/813 |
| 3-4883 | 2/1991 | Japan . | |

Primary Examiner—William A. Cuchlinski, Jr.
Assistant Examiner—G. Bradley Bennett
Attorney, Agent, or Firm—Oliff & Berridge

[57] ABSTRACT

A digital display micrometer gauge holds a workpiece to be measured between an anvil and a spindle. An engagement member is provided at an end of the spindle. An inner sleeve having an axial slit into which the engagement member is inserted, is secured to a U-shaped main frame, and an outer sleeve having a spiral groove, which is formed in the inner peripheral section thereof, is provided on the outer periphery of the inner sleeve to be circumferentially rotatable. By rotating this outer sleeve, the spindle can be driven at high speed. A main scale constituting a linear encoder is attached to a side surface of the spindle extending along the axis of the spindle, whereby the displacement amount of the spindle can be detected with high accuracy. A slide member slidable on the inner surface of the inner sleeve is provided at the end of the spindle where the engagement member is provided, and the spindle can be inserted into the inner sleeve together with the main scale attached thereto.

30 Claims, 18 Drawing Sheets

DIGITAL DISPLAY MICROMETER GAUGE

BACKGROUND OF THE INVENTION

1. Field of the Invention

This invention relates to a digital display micrometer gauge for measuring dimensions of a workpiece, including length and thickness, through displacement of a spindle.

2. Description of Related Art

The micrometer gauge has been conventionally used as a gauge for measuring dimensions of a workpiece through displacement of a spindle. Since it is easy to handle, this type of gauge is used by many machinists. As described in U.S. Pat. Nos. 4,550,507 and 4,578,868, the micrometer gauge generally comprises a U-shaped main frame, to which an inner sleeve is secured. A female screw is formed in the inner sleeve by precision machining, and a male screw of a spindle, likewise formed by precision machining, is engaged with this female screw. The spindle rotates through a thimble connected thereto, and, by reading the amount of this rotation, the workpiece is measured.

In this conventional micrometer gauge as described above, the rotation of the thimble is transmitted to the spindle through the male and female screws. The screw pitch is generally small, approximately 0.5 mm for example, so that the spindle cannot be displaced at high speed. This results in a rather poor operational efficiency, particularly when measurement is repeatedly conducted. A high speed displacement of the spindle might be ensured by roughening the screw pitch. However, that would result in deterioration in the measuring accuracy of the micrometer.

Micrometer gauges designed to solve the above problems are proposed in U.S. Pat. No 4,485,556 and Japanese Utility Model Publication No. 3-4883. In these gauges, the spindle is supported by the main frame at two positions of its middle section through the intermediation of stationary bearings. The spindle is displaced by a spindle displacement mechanism. The spindle displacement mechanism comprises a sleeve engaged with the main frame such that the sleeve is rotatable but not movable in the axial direction (dimension) of the spindle. A spiral groove is formed on the inner side of this sleeve and has a relatively large pitch. A spindle engagement section engages this spiral groove, and a spindle rotation preventing means controls the rotation of the spindle relative to the main frame. Due to this mechanism, high speed displacement of the spindle is ensured.

To ensure high measurement accuracy in digital display, the conventional gauge disclosed in Japanese Utility Model Publication No. 3-4883 includes, in addition to the above-described driving mechanism, an encoder. The encoder has a main scale arranged in the middle section of the spindle through the intermediation of an arm member such that the main scale extends parallel to the axial dimension of the spindle and an index scale provided on the main frame. The displacement amount of the spindle is detected in digital form by this encoder. In this type of conventional gauge, in which the spindle is directly supported by two bearings secured to the main frame, it is difficult for the main scale to be directly attached to the spindle. That is, when the main scale is directly secured to the spindle, it is necessary for the spindle to be considerably long. Otherwise, the main scale would hit against one of the bearings secured to the main frame when the spindle is moved away from the anvil. Thus, the size of the gauge would have to be rather large. That is why the main scale of the above-described conventional gauge is supported at a position offset from the axis of the spindle by a predetermined distance and extends parallel to the spindle.

However, this structure tends to generate measuring errors due to Abbe's principle. Furthermore, in this conventional gauge, the main scale supported by the arm member may oscillate when the entire gauge oscillates. So, the relative distance between the scale and the position transducer is subject to fluctuations, thereby causing measuring errors.

SUMMARY OF THE INVENTION

It is an object of the embodiments of the invention to provide a digital display micrometer gauge that can be used by a machinist familiar with the conventional micrometer gauge without difficulty and to allow high speed operation without any deterioration in measuring accuracy.

Another object of the embodiments of the invention is to provide a digital display micrometer gauge that can easily check the pressure applied to the workpiece when it is measured.

Still another object of the embodiments of the invention is to provide a micrometer gauge that allows high speed operation and is relatively free from the influence of the reactive force exerted by the workpiece during measurement.

To achieve these and other objects, a digital display micrometer gauge is provided that comprises a U-shaped main frame having an anvil. A spindle that can be axially displaced relative to the main frame is provided with one end abutting the anvil. An engagement member (a pin) is provided at the other end of the spindle and radially protrudes from the spindle. An inner sleeve having a slit into which the engagement member is inserted extends along the axial direction of the spindle and is secured to the main frame. An outer sleeve is fitted onto the outer periphery of the inner sleeve such that the outer sleeve is circumferentially rotatable and has in the inner peripheral section thereof a spiral groove adapted to engage with the engagement member. A slide member is provided at the other end of the spindle to be in sliding contact with the inner surface of the inner sleeve in the vicinity of the engagement member. A main scale is attached to a side surface of the spindle to reach the interior of the inner sleeve through movement of the spindle, and an index scale is provided on the main frame opposed to the main scale. A displacement detecting means is provided for detecting the displacement of the spindle from the relative displacement between the main scale and the index scale, and display means is provided for displaying the output of the displacement detecting means in digital form.

Many other features, advantages and additional objects of the present invention will become manifest to those versed in the art upon referring to the detailed description that follows and the accompanying sheets of drawings.

DETAILED DESCRIPTION OF PREFERRED EMBODIMENTS

Figure 1:
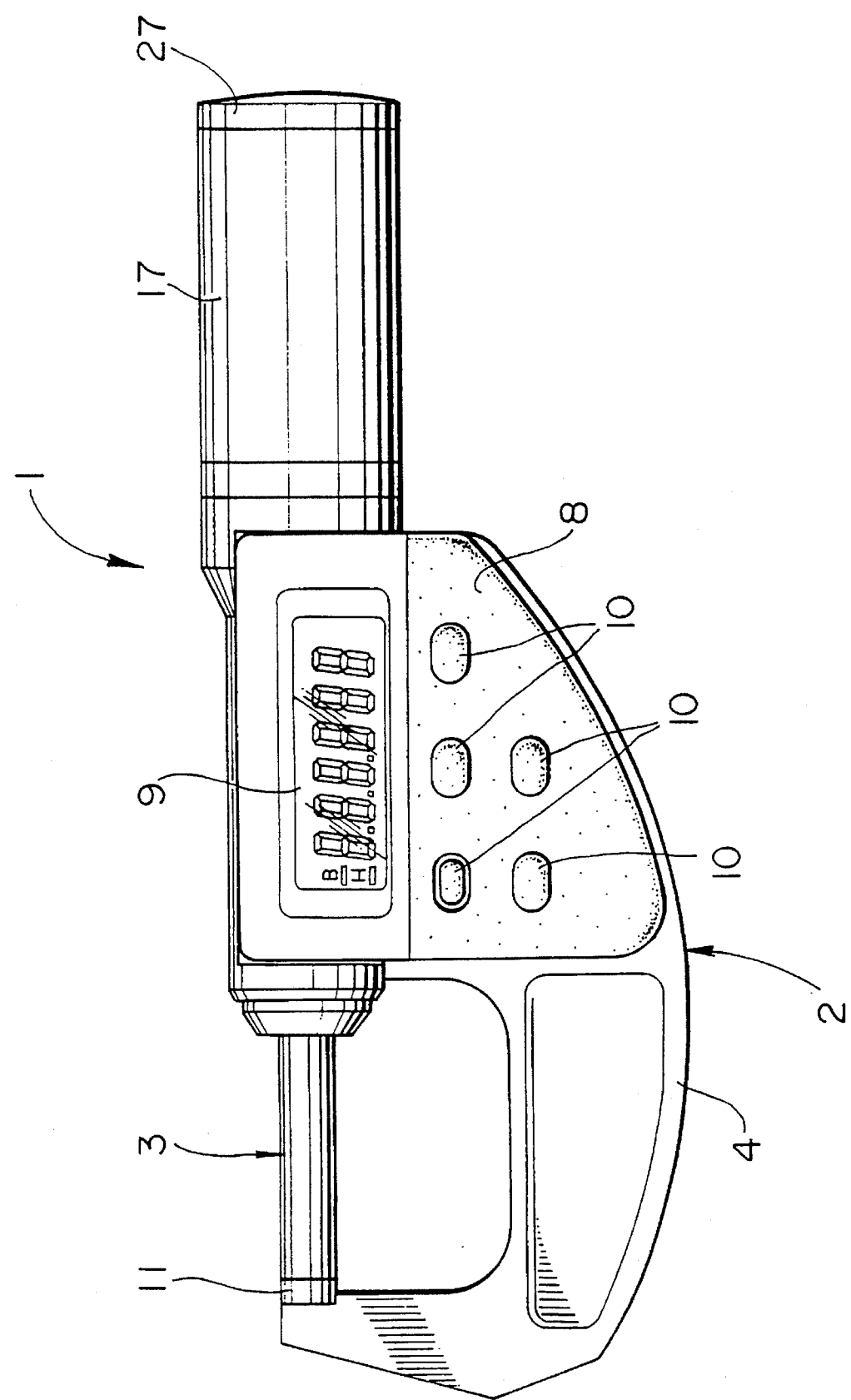
FIG. 1 is a front view of a digital display micrometer gauge according to a first embodiment of the invention.

FIGS. 1 through 10 are diagrams illustrating a gauge according to the first embodiment of the present invention.

It should be noted that, in the accompanying drawings, the same components are indicated by the same reference numerals. Accordingly, the description of such components will be omitted or only slightly touched upon when they are referred to again.

Figure 2:
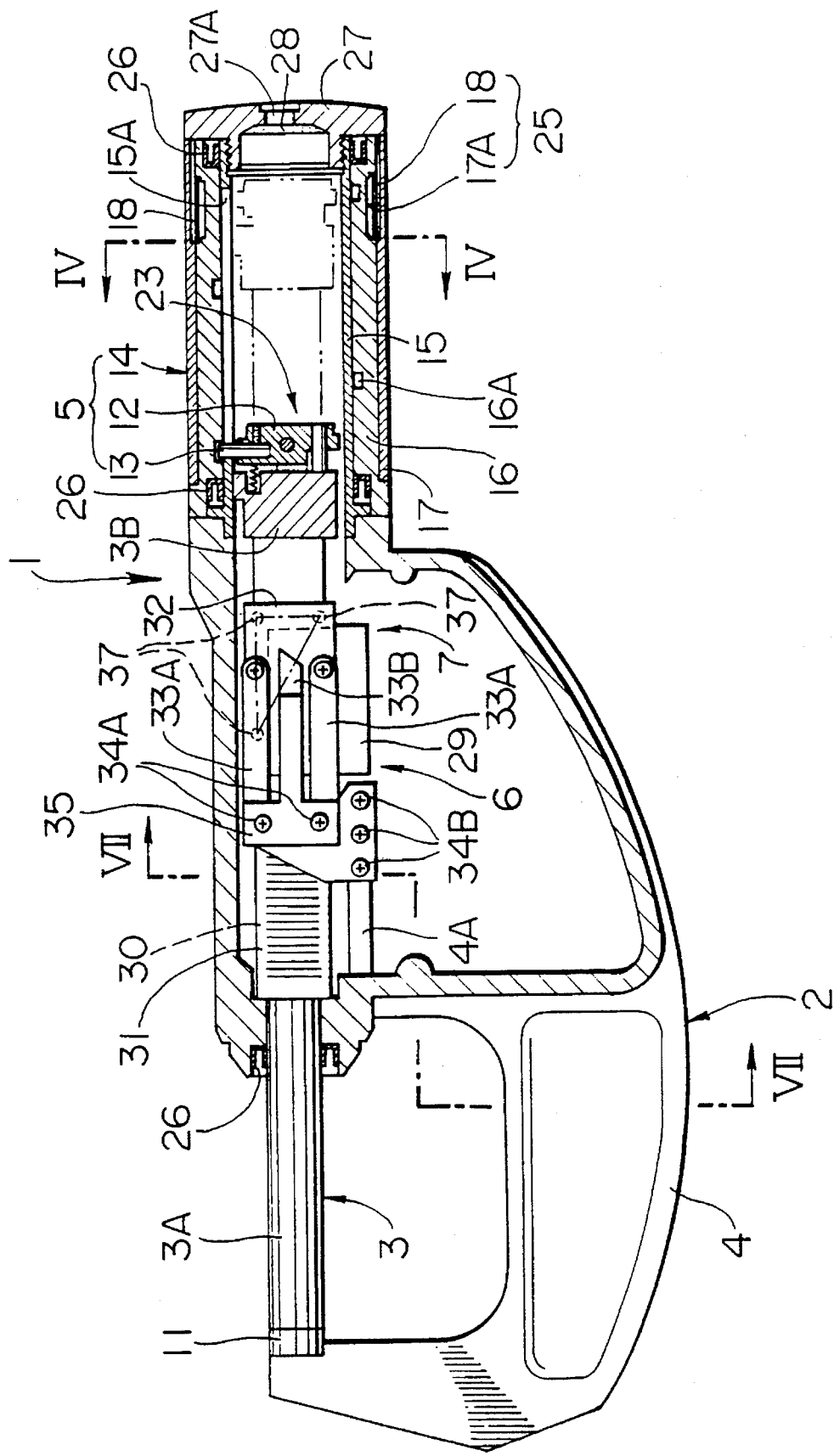
FIG. 2 is a front view in partial section of the gauge of the embodiment shown in FIG. 1.

In FIGS. 1 through 10, a digital display micrometer gauge 1 has a main body 2 formed as a closed, water/dust-proof structure. A spindle 3 is adapted to project from and retract into main body 2. As seen in FIG. 2, main body 2 includes a U-shaped main frame 4, a spindle driving mechanism 5 for causing spindle 3 to advance and retreat, and a position transducer 6 for detecting the displacement amount of spindle 3. A gap control mechanism 7 is provided between U-shaped main frame 4 and spindle 3. A cover member 8, seen in FIG. 1, is provided on the front surface of U-shaped main frame 4. A digital display device 9 and a plurality of operating switches 10 are provided on the front surface of cover member 8.

Figure 3:
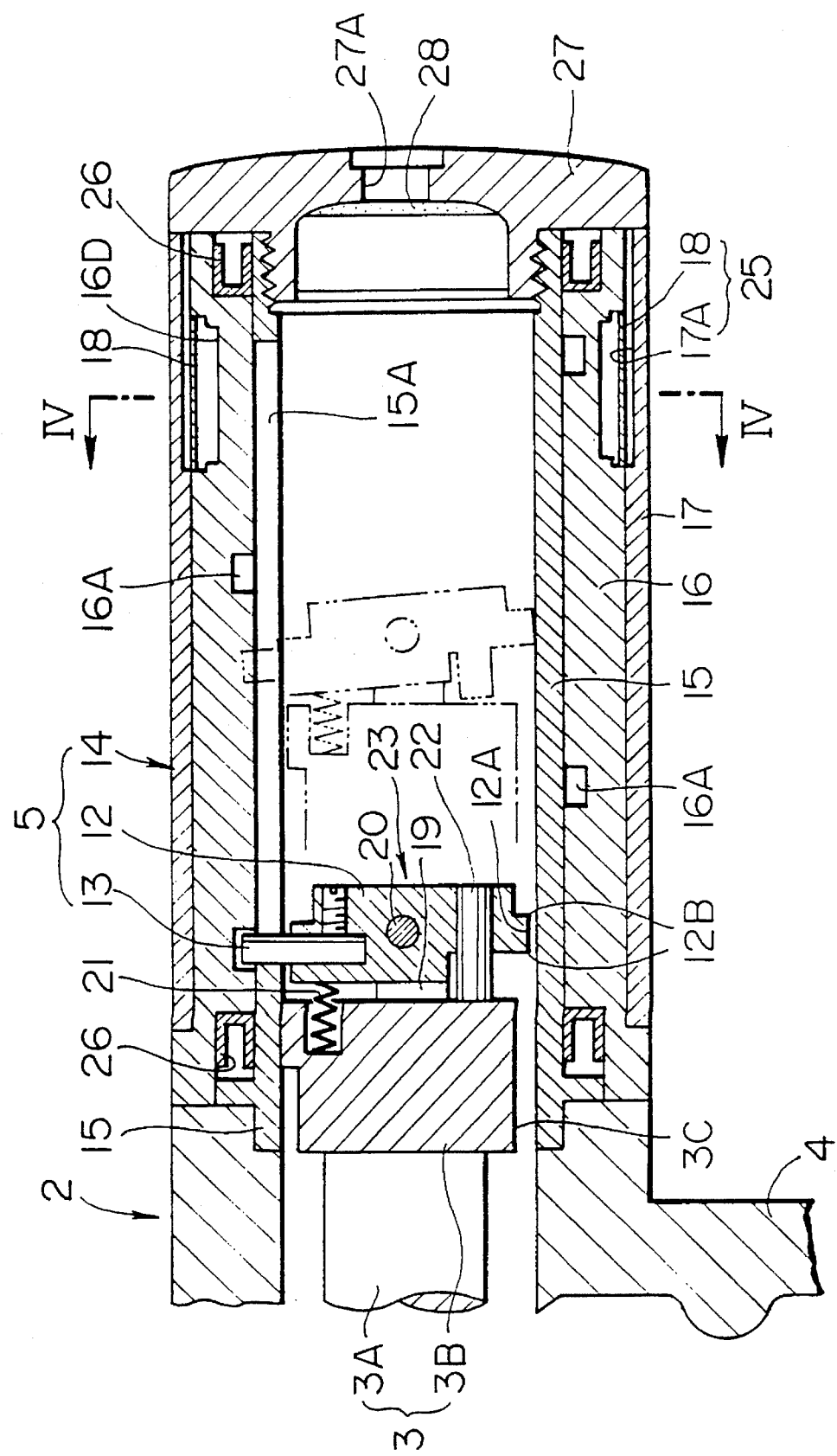
FIG. 3 is a partial enlarged sectional view showing the spindle driving mechanism of the gauge of the embodiment shown in FIG. 1.

The U-shaped main frame 4 has two outwardly extending ends defining an opening with an anvil 11 disposed at one of the ends as seen in FIG. 1. At the other end of main frame 4, spindle 3 is supported such that it can be axially displaced. One end of spindle 3 is adapted to abut against anvil 11. Referring to FIG. 3, spindle 3 comprises a spindle body 3A, one end of which can abut against anvil 11, and a slide member 3B provided at the other end of spindle body 3A.

Position transducer 6 is a capacitive type linear encoder, which comprises an index scale 29, arranged inside U-shaped main frame 4 through the intermediation of gap control mechanism 7, and a main scale 31. Main scale 31 is arranged on :spindle body 3A through the intermediation of a scale mounting member 30.

Figure 7:
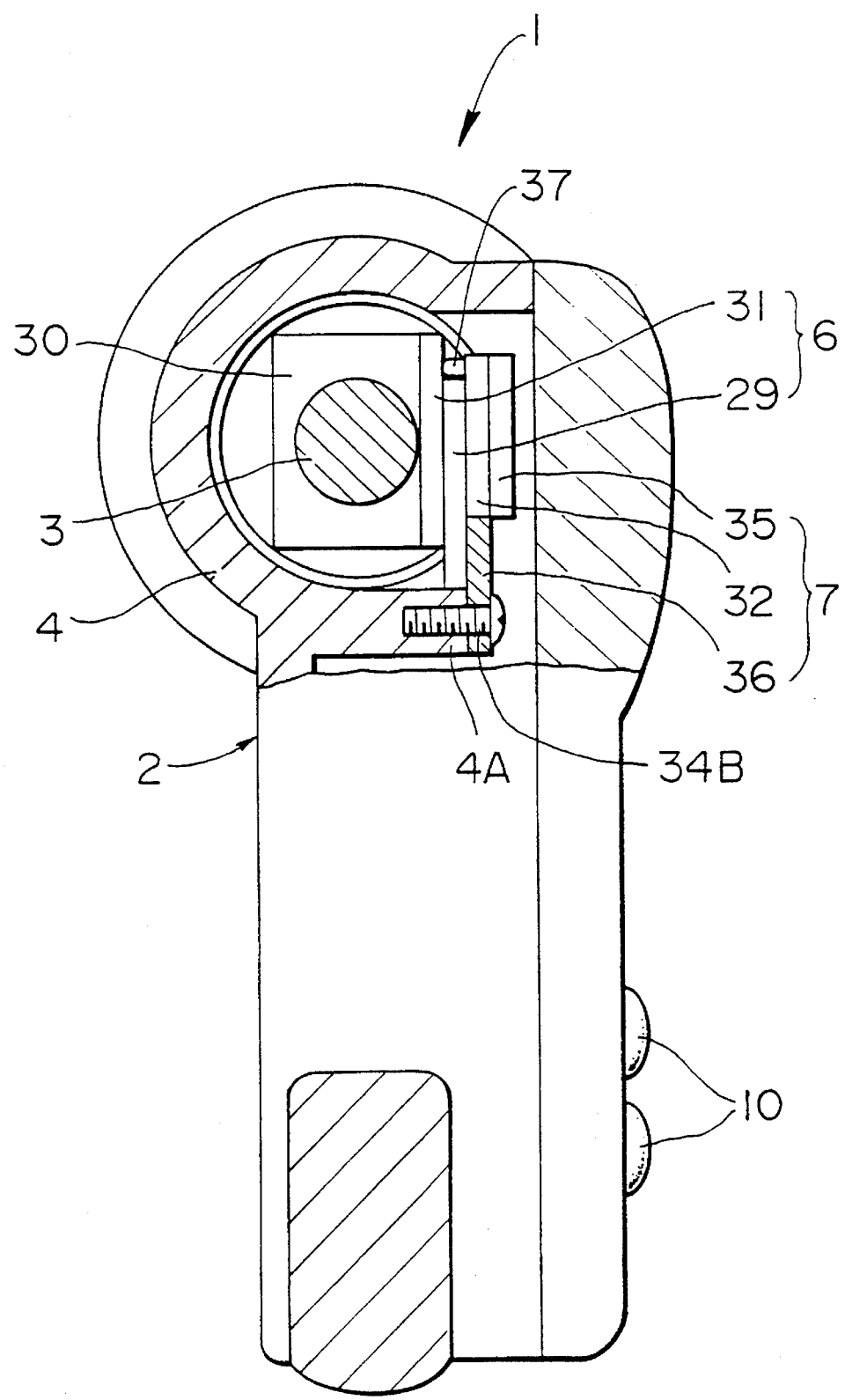
FIG. 7 is an enlarged cross-sectional view taken in the direction of the .arrows along line VII—VII of FIG. 2.
Figure 8:
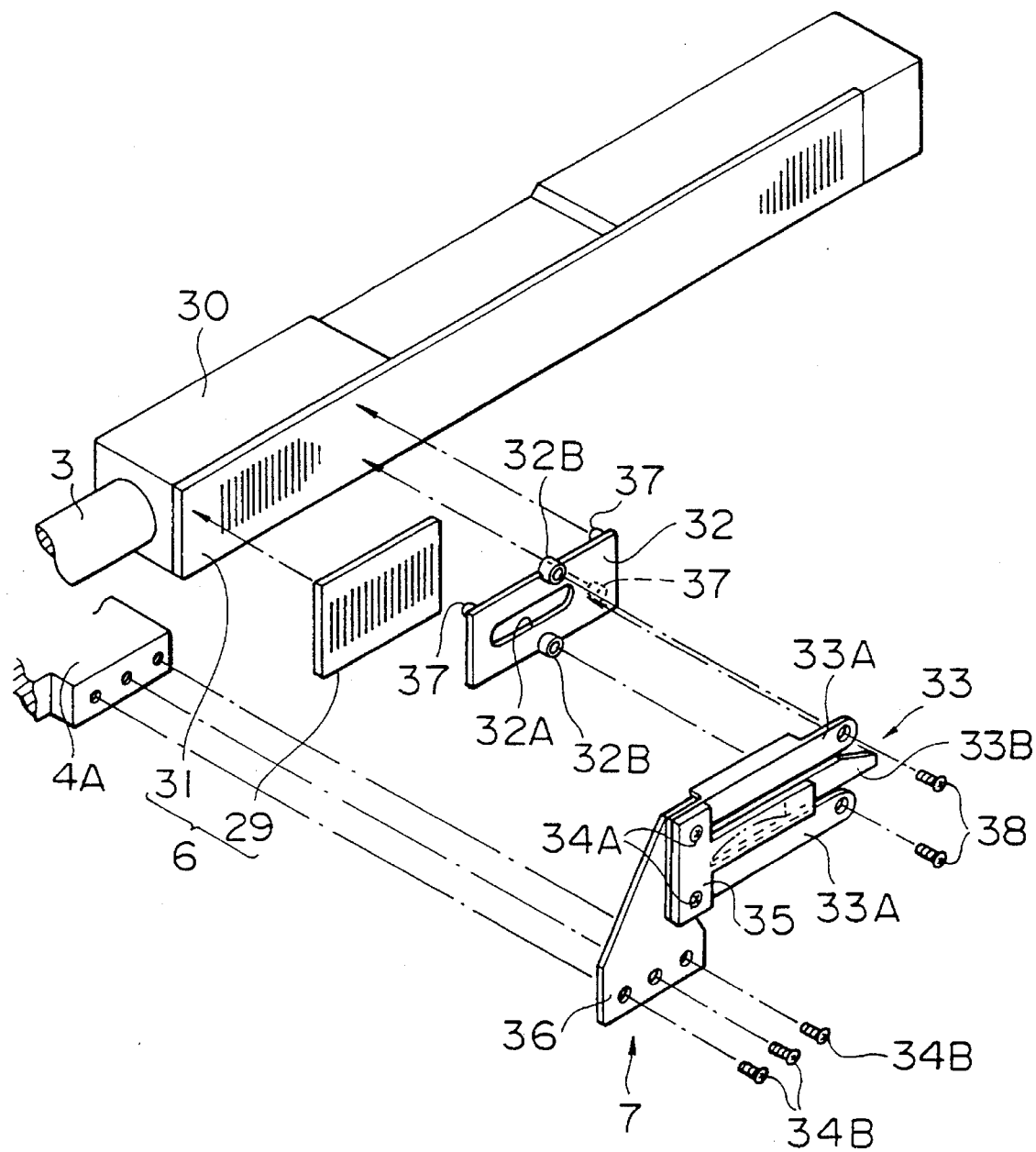
FIG. 8 is an exploded perspective view illustrating how a gap control mechanism of the gauge of FIG. 1 is mounted.

Main scale 31, seen in FIGS. 2, 7 and 8, comprises a group of lattice electrodes aligned at a fixed pitch along the axial direction of spindle 3 and a group of earth electrodes arranged between the group of lattice electrodes. Index scale 29 comprises a transmission electrode group consisting of a plurality of pairs of transmission electrode elements and a reception electrode group. The measurement principle of this capacitive type linear encoder is described in detail in U.S. Pat. No. 5,053,715.

Position transducer 6 is connected to digital display device 9, shown in FIG. 1, through conventional electric devices, such as a counter and CPU (not shown). By manipulating operating switches 10 in a known manner, the displacement amount of spindle 3 is displayed in digital form on digital display device 9.

Figure 18:
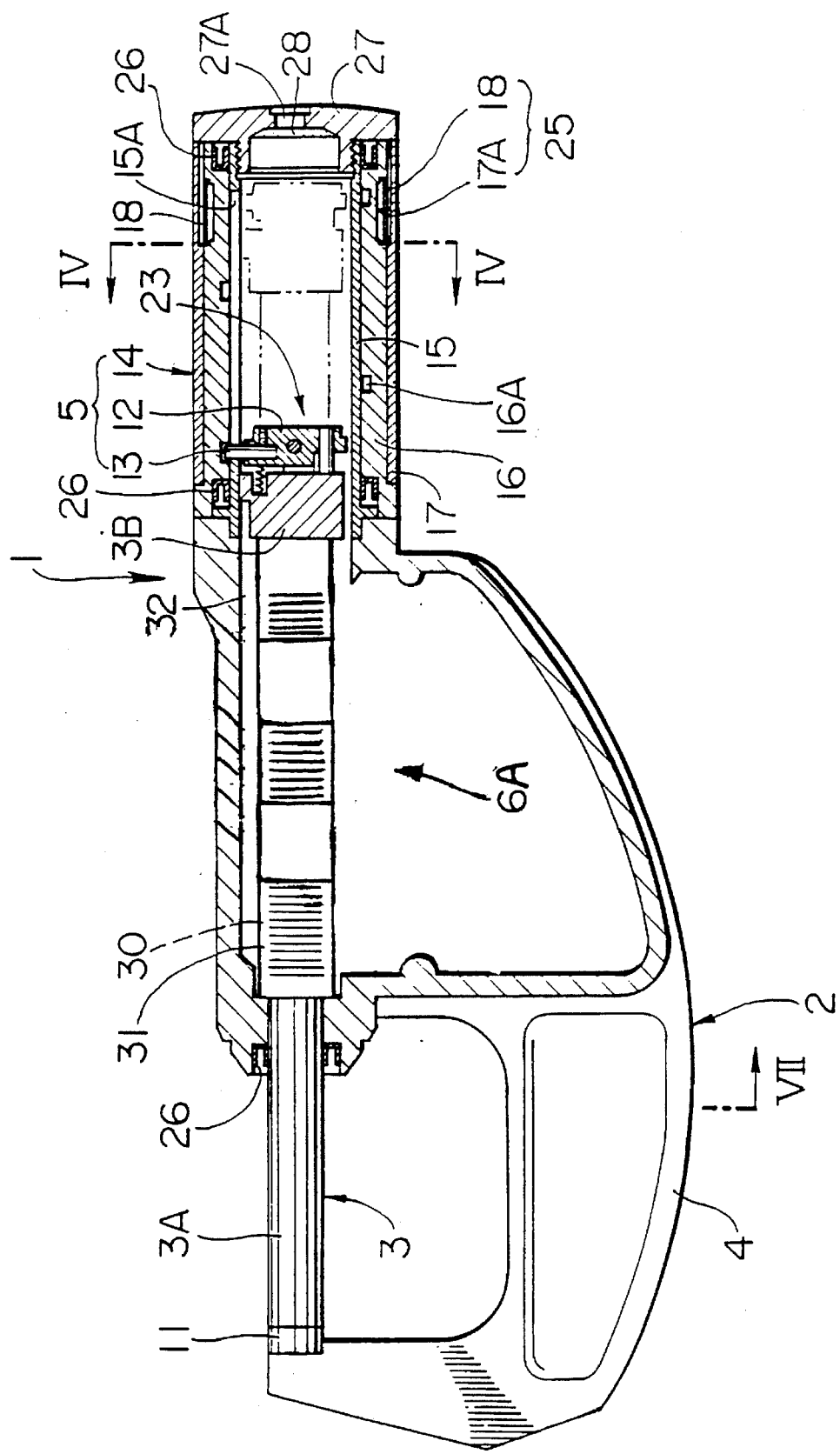
FIG. 18 is a front view in partial section of the gauge using an optical type encoder.

Apart from the above capacitive type linear encoder, it is also possible to employ a photoelectric type encoder 6A as schematically seen in FIG. 18 for the position transducer utilizing a ray of light that is under the influence of lattice groups on the main and index scales or a magnetic type encoder utilizing a magnetic action. For example, the photoelectric type encoder disclosed in U.S. Pat. No. 5,026,164 could be employed, this disclosure being incorporated herein by reference. However, using a capacitive type linear encoder as in the case of the gauge of the first embodiment is advantageous in that it requires a relatively small power consumption.

FIG. 3 is an enlarged view of spindle driving mechanism 5, which comprises a stopper 12 attached to the other end of slide member 3B of spindle 3, a pin-like engagement member 13 attached to stopper 12, and an engagement member driving mechanism 14 for causing engagement member 13 to advance and retreat along the axial direction of spindle 3.

Figure 4:
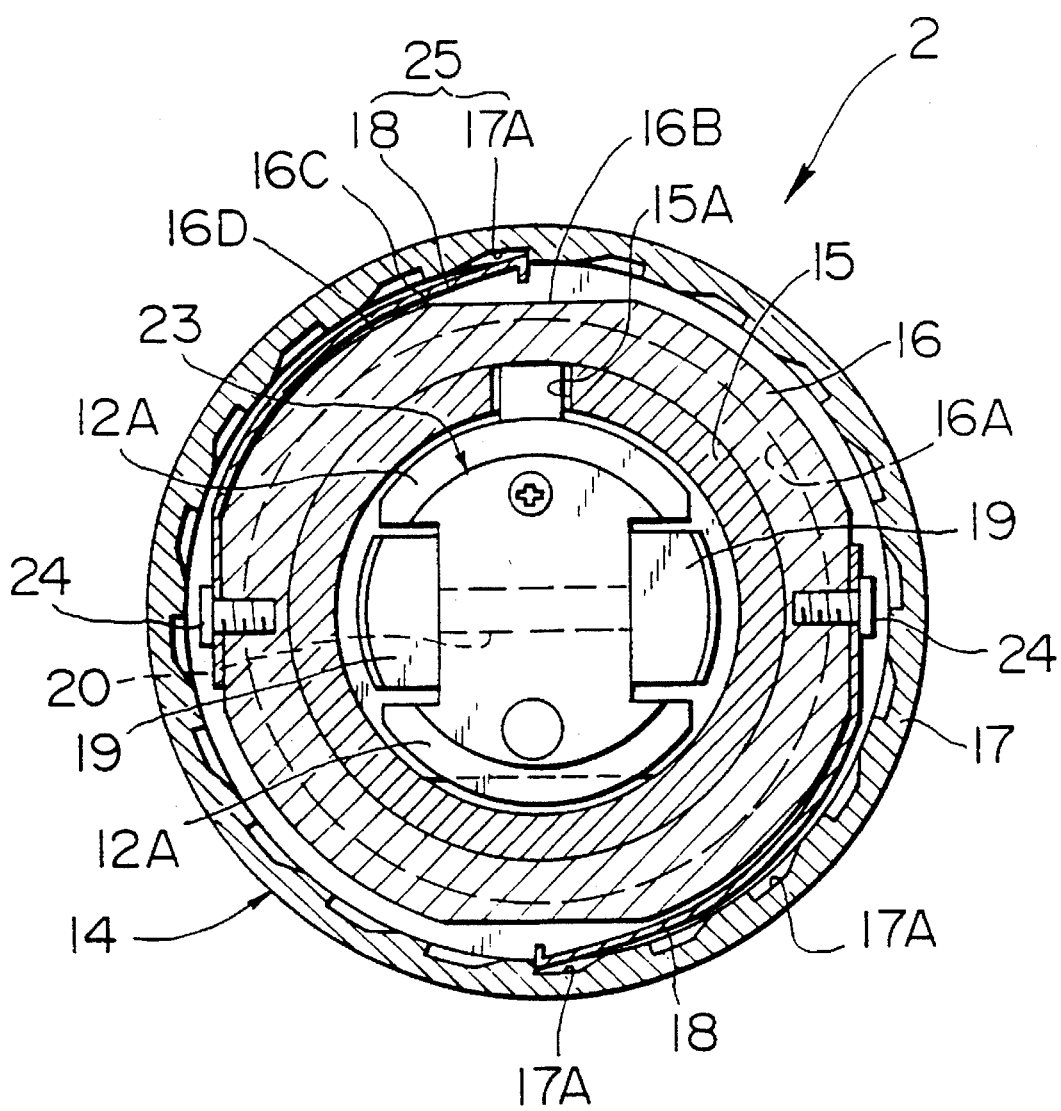
FIG. 4 is a cross-sectional view taken in the direction of the arrows along line IV—IV of FIG. 2.
Figure 5:
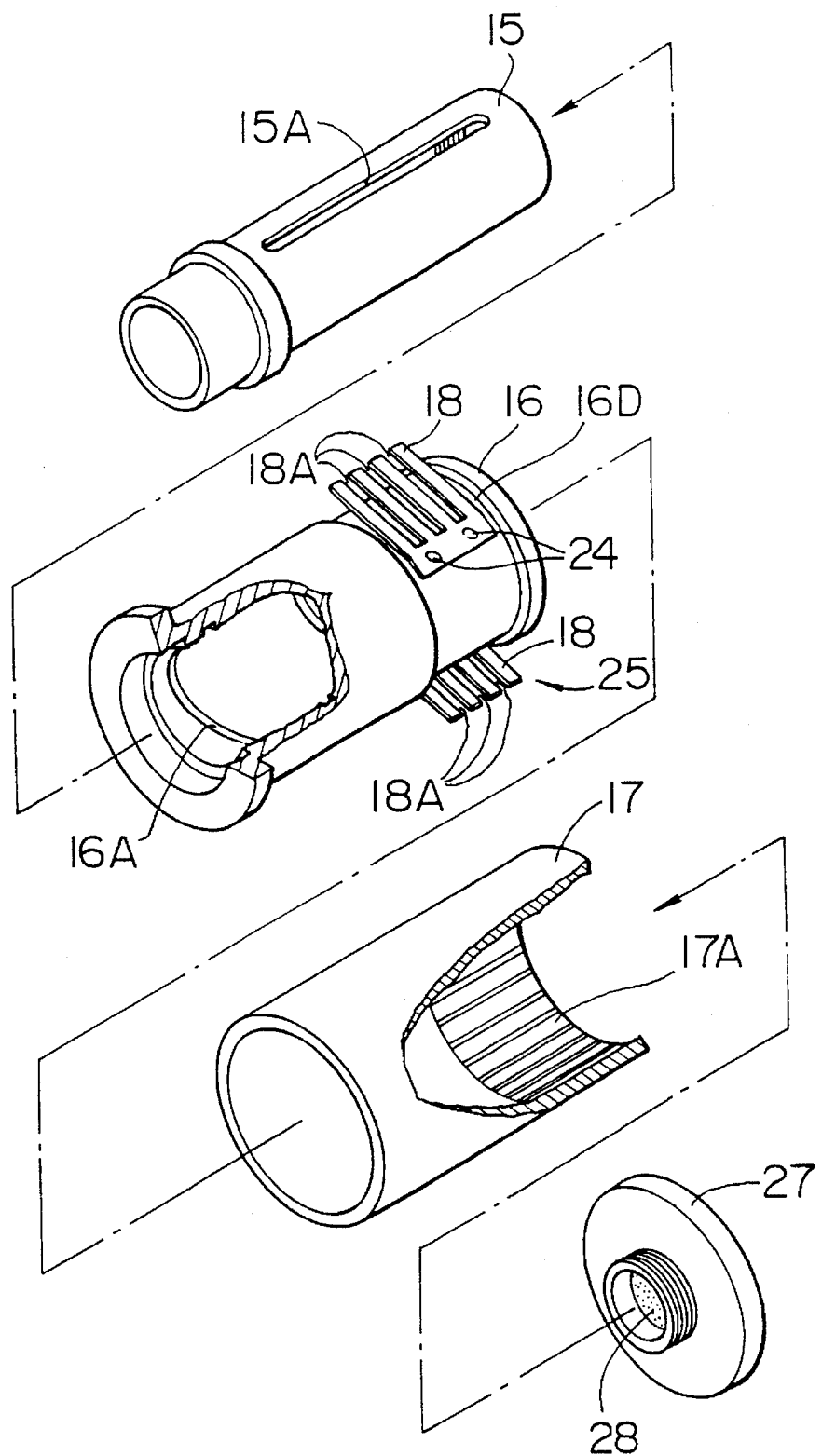
FIG. 5 is an exploded perspective view in partial section of the spindle driving mechanism shown in FIG. 3.

Engagement member driving mechanism 14 comprises an inner sleeve 15 and an outer sleeve 16, as seen in FIGS. 3–5. One end of inner sleeve 15 is secured to U-shaped frame 4 and has a slit 15A into which engagement member 13 is inserted extending along the axial direction of spindle 3. Outer sleeve 16 fits onto the outer periphery of inner sleeve 15 to be circumferentially rotatable and has in the inner peripheral section thereof a spiral groove 16A that engages with engagement member 13. A thimble 17 rotatably fits onto the outer peripheral surface of outer sleeve 16. Two plate springs 18 are arranged between thimble 17 and outer sleeve 16. When thimble 17 is rotated in one direction, the torque of this rotation is transmitted to spindle 3 through plate springs 18, spiral groove 16A of outer sleeve 16, and engagement member 13. Thereby, spindle 3 advances toward anvil 11. Rotating thimble 17 in the other direction causes spindle 3 to retreat. Spiral groove 16A has a relatively large pitch. Specifically, it is larger than the screw pitch of a conventional micrometer.

Slide member 3B of spindle 3 is slidably supported in inner sleeve 15 and contacts inner sleeve 15 about the periphery of spindle 3 except for cutout 3C formed in spindle 3. When spindle 3 moves away from anvil 11, spindle body 3A, on which main scale 31 is provided, is inserted into inner sleeve 15, as indicated by the imaginary line of FIG. 2.

A pair of raised portions 19 are provided on slide member 3B of spindle 3 opposed to each other, as shown in FIG. 4. A pin 20 extending in a radial direction of spindle 3 is fastened to raised portions 19. Stopper 12 is rotatably supported by pin 20, as seen in FIG. 3.

Stopper 12 is formed to leave a gap (clearance) between it and the inner wall of inner sleeve 15. A flange 12A with substantially right-angled edges 12B on the front and rear sides thereof with respect to the advance/retreat dimension of spindle 3 extends radially from stopper 12. When stopper 12 rotates on pin 20, edges 12B engage with the inner surface of inner sleeve 15, as shown in phantom in FIG. 3.

A coil spring 21 for biasing the stopper 12 toward clockwise rotation (as seen in FIG. 3) is embedded in slide member 3B of spindle 3, and a pin 22 for hindering this clockwise rotation of stopper 12 and, hence engagement member 13 is embedded in stopper 12. Coil spring 21 and pin 22 constitute a holding mechanism 23, which holds stopper 12 with engagement member 13 radially protruding from spindle 3. When a force in excess of a certain level is applied to engagement member 13 in the spindle advancing direction, holding mechanism 23 permits stopper 12 to rotate counterclockwise (as seen in FIG. 3) against the biasing force of coil spring 21.

In the first embodiment, cutout 3C is formed in slide member 3B of spindle 3, and the remaining portion of slide member 3B is slidable against inner surface of inner sleeve 15. Thus, if edges 12B of the stopper 12 leave damage in the form of recesses and protrusions on the inner surface of inner sleeve 15, slide member 3B can move over the damage due to the gap left by cutout 3C without being hindered by this damage. So, slide member 3B can smoothly slide on the inner surface of inner sleeve 15 even after the operation of holding means 23.

Figure 6:
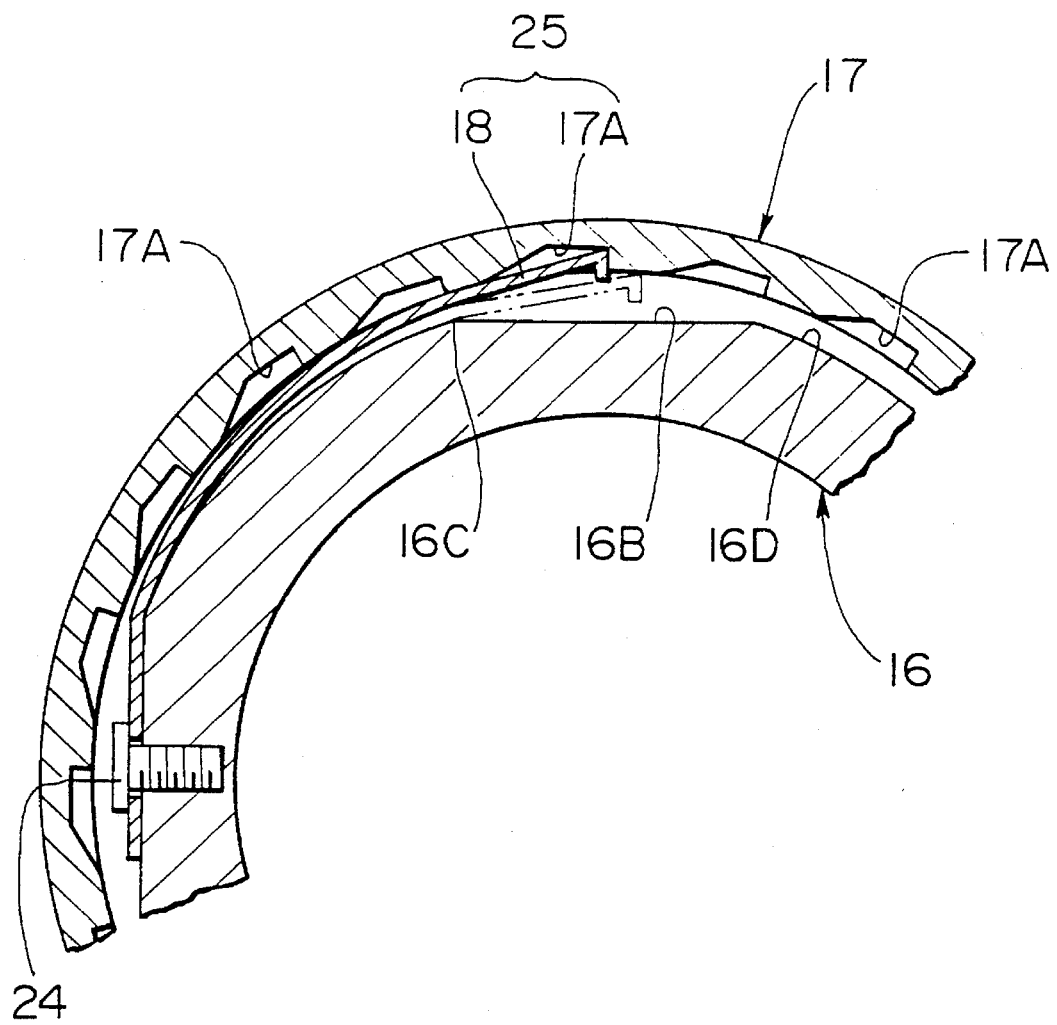
FIG. 6 is a partial enlarged sectional view illustrating how the thimble and outer sleeve of the spindle driving mechanism of FIG. 3 are mounted.

FIGS. 4 through 6 show the mounting structure for plate springs 18. Referring to FIGS. 4 and 5, a recess 16D is formed in the outer periphery of outer sleeve 16 over the entire circumference. Base portions of plate springs 18 are attached to recess 16D by screws 24. A ratchet wheel 17A against which the tips of plate springs 18 abut is formed in the inner peripheral section of thimble 17. Ratchet wheel 17A and plate springs 18 constitute a constant pressing device 25. When thimble 17 rotates in one direction to cause a force not smaller than a certain level of strength to be generated between outer sleeve 16 and thimble 17, plate springs 18 are bent to cause thimble 17 to race relative to outer sleeve 16.

Each plate spring 18 has a plurality of notches 18A extending from the base portion to the tip thereof. By appropriately setting the width dimension of plate springs 18, it is possible to adjust the resilient force of plate springs 18 and, further, the force with which constant pressing device 25 operates.

As shown in FIG. 6, cutout sections 16B are formed in recess 16D of outer sleeve 16. An edge 16C of each cutout section 16B serves as a bending fulcrum when plate spring 18 is bent as a result of the racing of thimble 17 relative to outer sleeve 16.

As shown in FIG. 2, ring-like seal members 26 are respectively provided between spindle 3 and U-shaped frame 4 and between inner sleeve 15 and outer sleeve 16. An end cap 27 is threadedly engaged with the open end portion of inner sleeve 15. End cap 27 has an opening 27A through which the interior of gauge body 2 communicates with the exterior atmosphere.

A porous member 28 closes opening 27A and is attached to the inner side of end cap 27. Porous member 28 preferably consists of a synthetic resin filter (for example, OLEO VENTIFILTER (product name) manufactured by GORE-TEX), which allows transmission of gas but not of liquid or solid. Whereby, it is possible to prevent changes in the pneumatic pressure of the closed space inside U-shaped frame 4 when spindle 3 moves in and out.

FIGS. 7 through. 9 show the structure of gap control mechanism 7 in detail. As shown in FIGS. 7 and 8, gap control mechanism 7 comprises a first mounting member 32 to which index scale 29 is secured, preferably bonded, a second mounting member 33 to which first mounting member 32 is attached by screws 38, and a third mounting member 36 to which second mounting member 33 is attached by screws 34A and a T-shaped member 35. Third mounting member 36 is attached to a mounting protrusion 4A of U-shaped frame 4 by screws 34B.

First mounting member 32 has three protrusions 37 positioned on the outer side of index scale 29. The tips of protrusions 37 slidably abut against the electrode edge portions of main scale 31, whereby index scale 29 and main scale 31 can move relative to each other along the axial direction of spindle 3 and are held witch a predetermined gap therebetween. Further, a hole 32A is formed in the central portion of first mounting member 32. Two protrusions 32B for mounting screws 38 are formed respectively on each side of the hole 32A.

Figure 9:
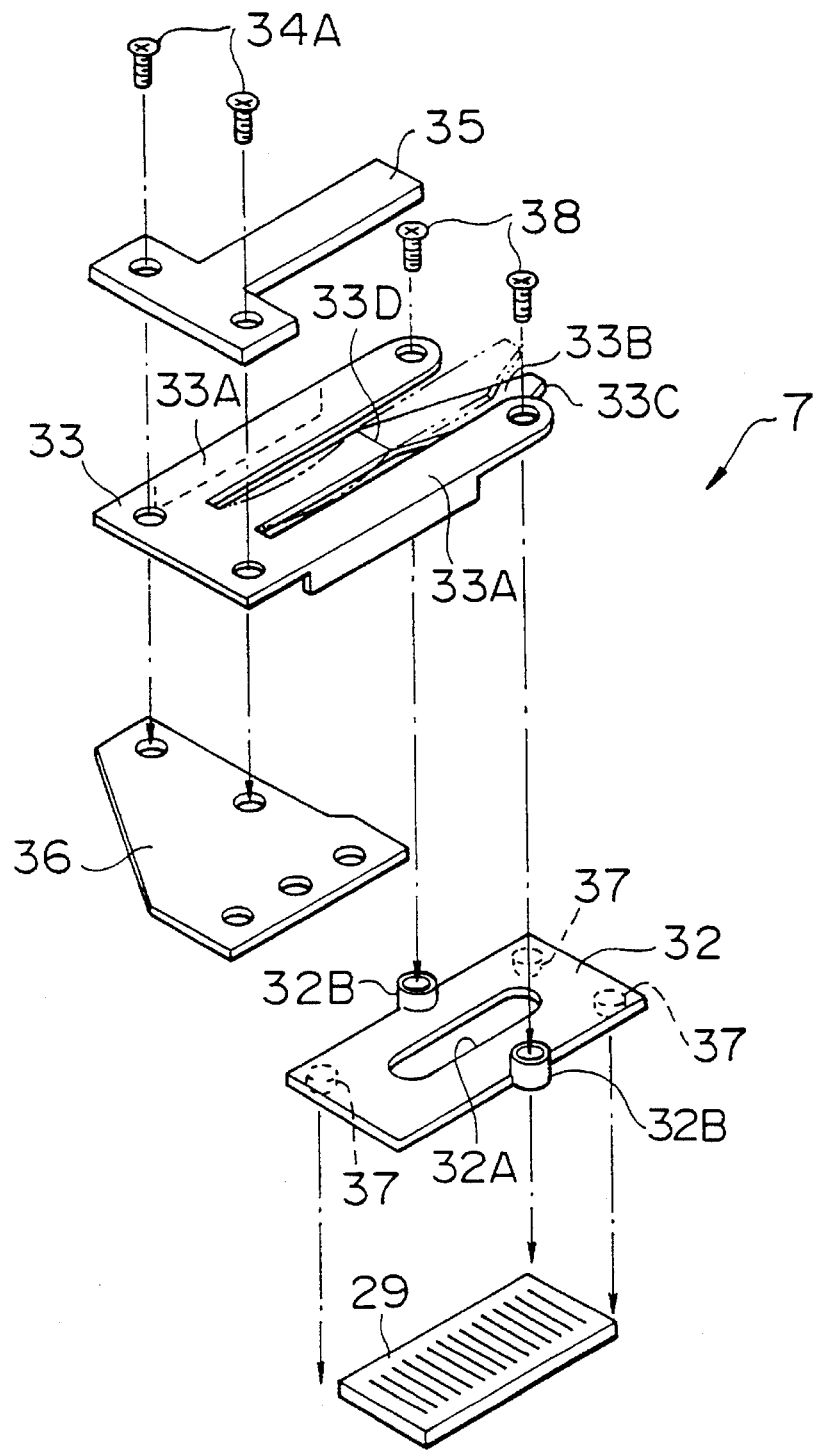
FIG. 9 is an exploded perspective view of the gap control mechanism shown in FIG. 8.

Referring to FIG. 9, second mounting member 33 is a plate spring having notches between side portions 33A and a central portion 33B thereof. Edge sections of side portions 33A are bent to enhance their rigidity. Central portion 33B comprises a forward end section 33C and a middle section 33D, which are bent toward first mounting member 32. Middle section 33D is pressed toward first mounting member 32 by T-shaped plate member 35, whereby central portion 33B functions as a biasing means. The biasing center of central portion 33B is at a position where the forward end section 33C abuts against first mounting member 32. This position corresponds to the center of gravity of the imaginary triangle formed by vertices defined by the three protrusions 37 (see FIG. 2). Thus, by applying a force to the three protrusions 37, a uniform biasing force can be exerted on main scale 31.

Figure 10:
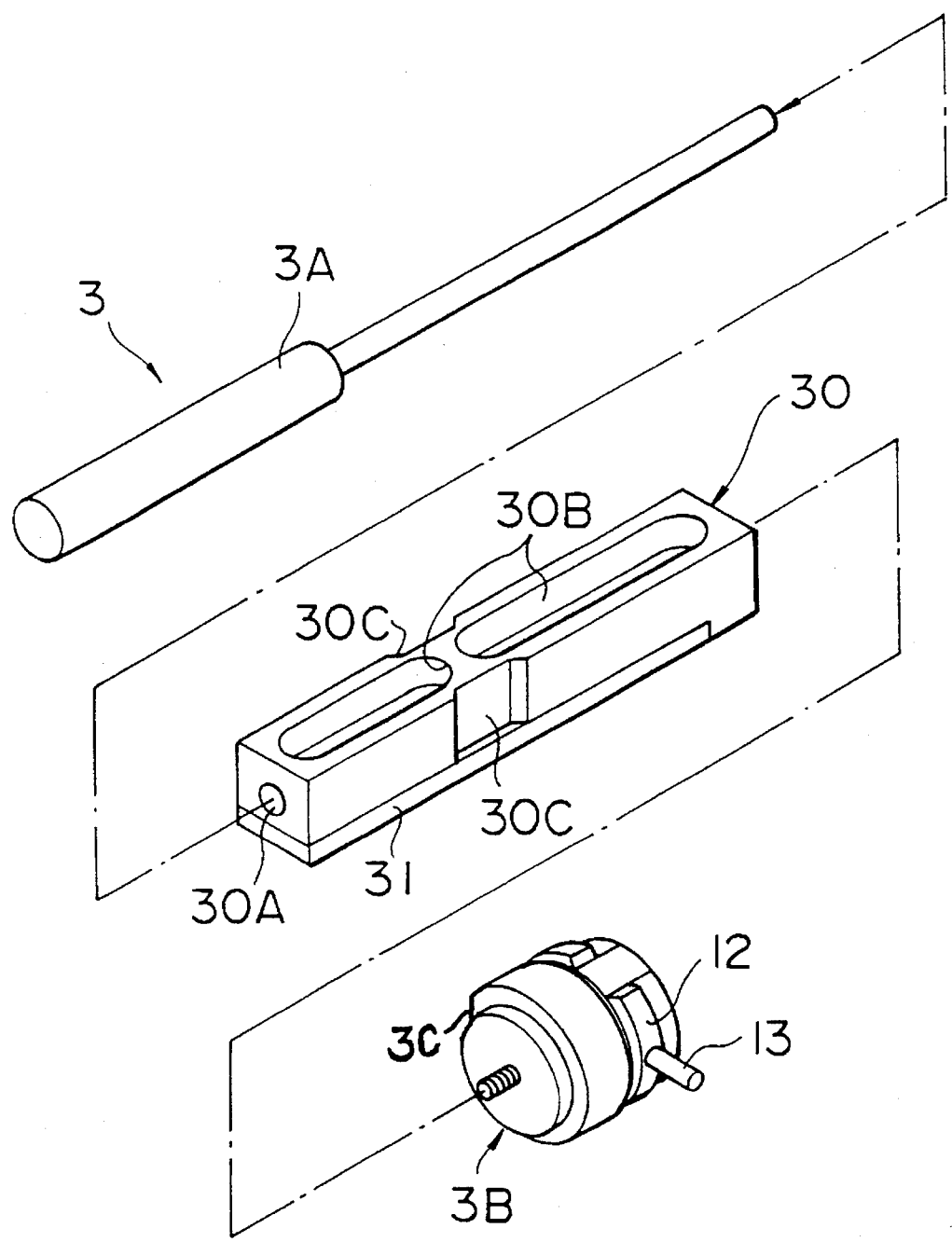
FIG. 10 is an exploded perspective view of the spindle of the gauge of the embodiment shown in FIG. 1.
Figure 11:
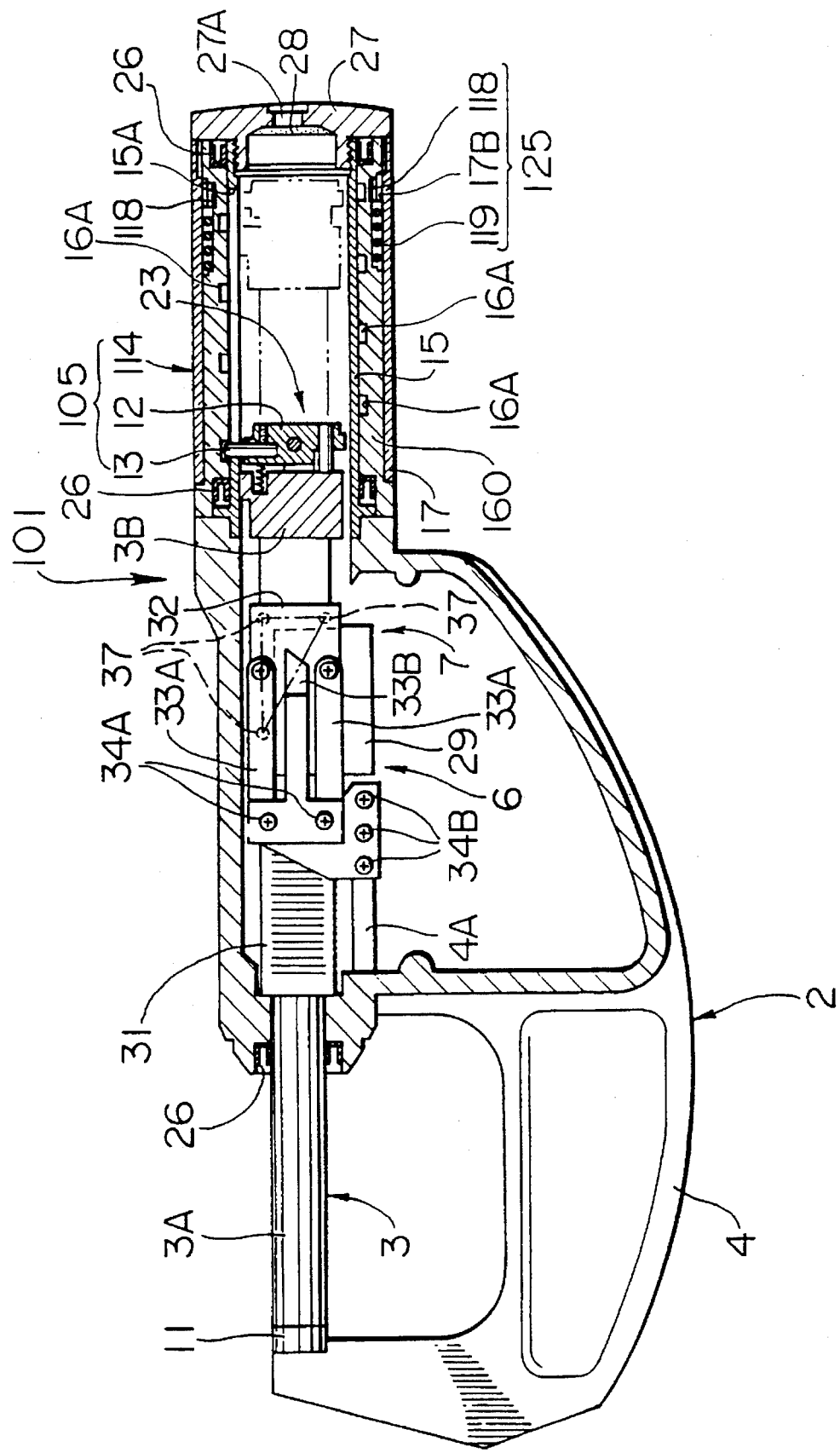
FIG. 11 is a front view in partial section of a digital display micrometer gauge according to a second embodiment of the present invention.
Figure 12:
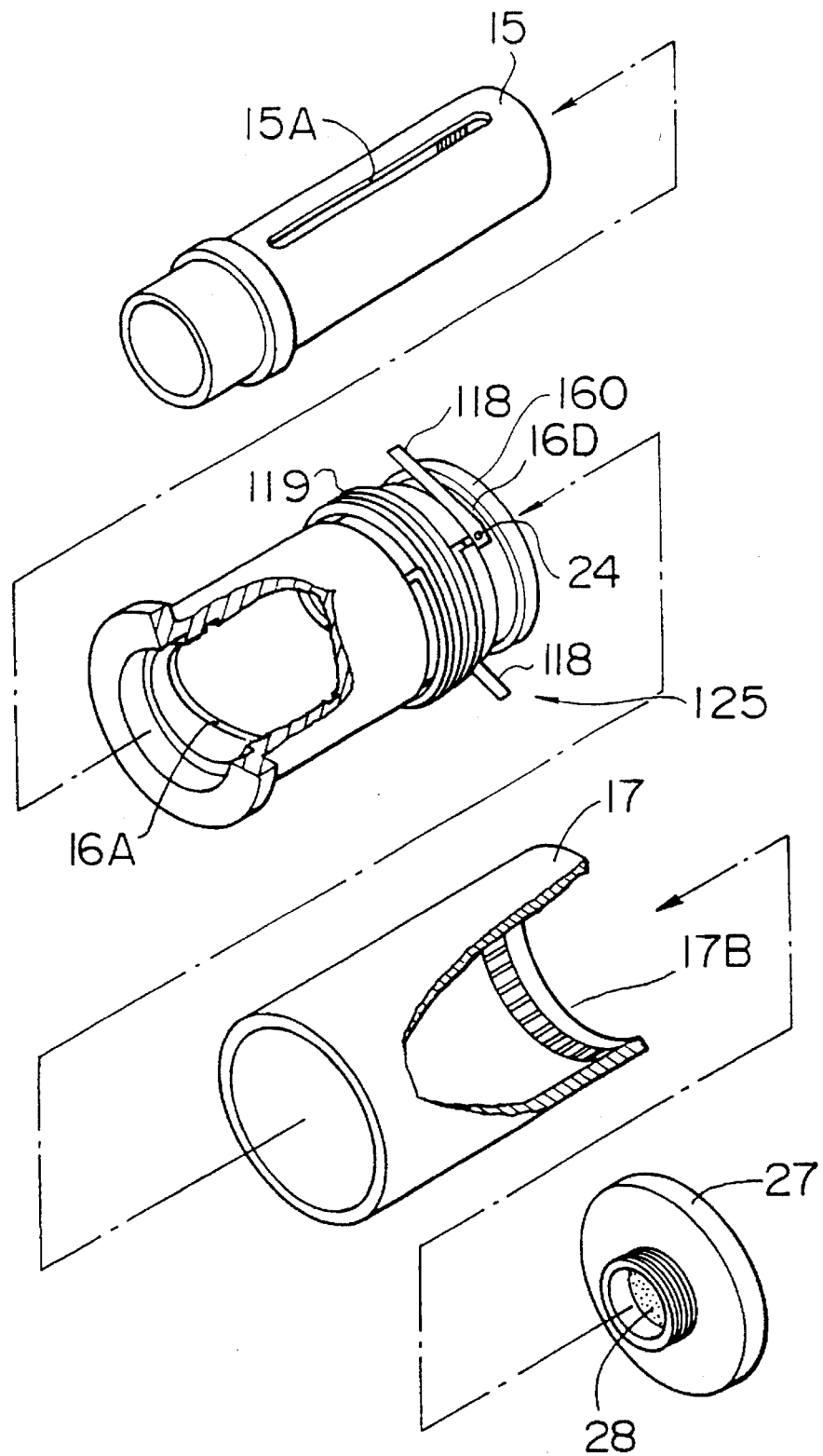
FIG. 12 is an exploded perspective view in partial section showing the spindle driving mechanism of the gauge of the second embodiment.
Figure 13:
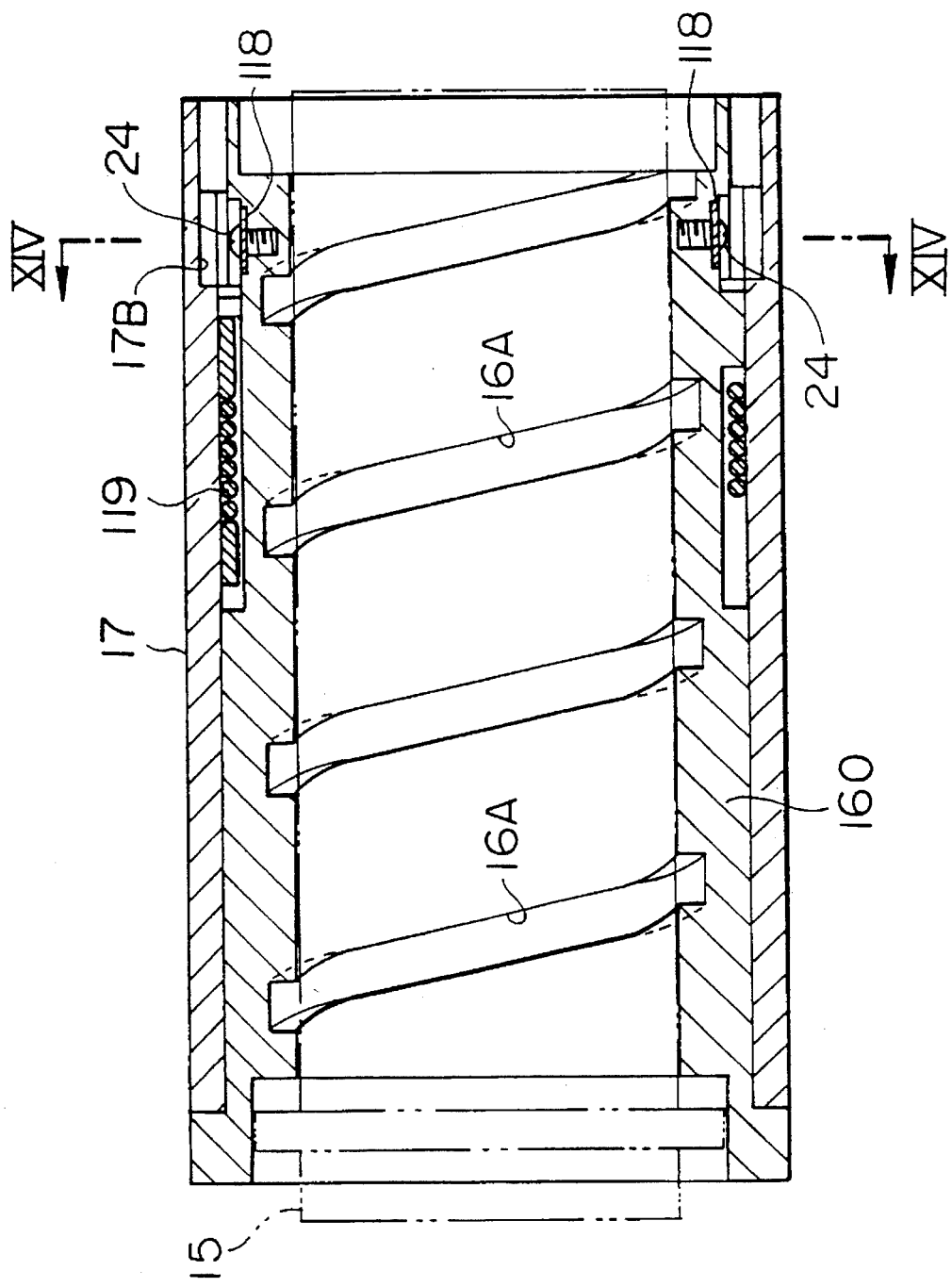
FIG. 13 is an enlarged cross-sectional view showing the spindle driving mechanism of the gauge of the second embodiment.
Figure 14:
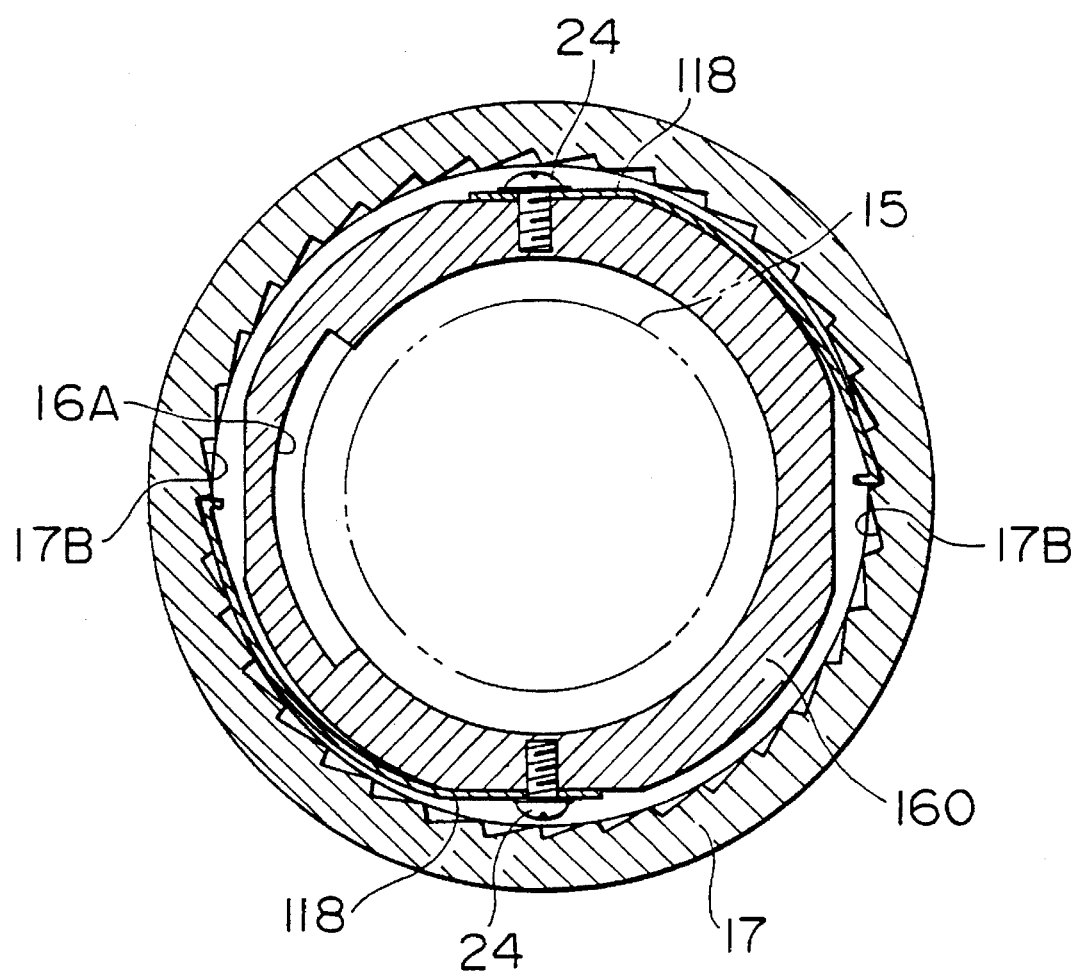
FIG. 14 is an enlarged cross-sectional view taken in the direction of the arrows along line XIV—XIV of FIG. 13.

FIG. 10 shows the mounting structure for scale mounting section 30 and spindle 3. In FIG. 10, spindle body 3A is formed as a stepped cylinder having a large-diameter and a small-diameter section, the latter of which is threadedly engaged with slide member 3B. The back side of main scale 31 is secured, preferably by bonding, to scale mounting member 30, which has a longitudinal through-hole 30A through which the small-diameter section of the spindle body 3A is inserted. Thus, the entire scale mounting member 30, including both ends with respect to the axial direction of spindle 3, is attached to spindle body 3A.

Scale mounting member 30 has cavities 30B to reduce its weight and a side recess 30C for accommodating surplus adhesive squeezed out when main scale 31 is glued to this scale mounting member 30. In the case of a gauge of a type that generates electricity through the advance and retreat of spindle 3, a rack (not shown) is formed on a side surface of scale mounting member 30, and an electric generator having a pinion in mesh with this rack is arranged in gauge body 2.

In the gauge of the first embodiment, thimble 17 of spindle driving mechanism 5 is rotated in one direction. A workpiece to be measured is placed between anvil 11 and one end of spindle 3. The torque of the rotation of thimble 17 is transmitted to constant pressing device 25, spiral groove 16A of outer sleeve 16, engagement member 13 and stopper 12. However, due to the structure of spindle driving mechanism 5, which only allows displacement along the longitudinal direction of slit 15A, spindle 3 and stopper 12 do not rotate, and advance only along the axial direction. Since spiral groove 16A has a relatively large pitch, this advance of spindle 3 takes place at a higher speed than in the conventional screw-type micrometer gauge. The displacement of spindle 3 from anvil 11 is detected by position transducer 6, having main scale 31 and index scale 29, and is displayed on digital display device 9. When one end of spindle 3 has abutted against the workpiece to be measured, the operator reads the displacement amount displayed at that time.

When thimble 17 is further rotated with one end of spindle 3 abutting against the workpiece, a force is generated that urges stopper 12 to rotate. When this force reaches a certain level, holding mechanism 23 operates, and the advance of spindle 3 is hindered by stopper 12. That is, an edge 12B of stopper 12 engages in the inner surface of inner sleeve 15 against the resilient force of the coil spring 21. Thus, by appropriately adjusting the resilient force of coil spring 21, the measurement pressure during measurement of the workpiece can always be kept constant. In some cases, spindle 3 could be caused to retreat by a strong reactive force from the workpiece to be measured. However, since stopper 12 receives a counterclockwise torque and edge 12B engages in the inner surface of inner sleeve 15, the retreat of spindle 3 is hindered.

When thimble 17 is further rotated, it becomes inclined to rotate relative to outer sleeve 16. When this torque exceeds a certain level, constant pressing device operates to cause thimble 17 to race. This prevents an excessive force from being applied to engagement member 13 to damage the same. The lock effected by stopper 12 is released by rotating the thimble 17 in the reverse direction to cause stopper 12 to retreat.

When thimble 17 is rotated in the reverse direction for a next measurement, spindle 3 moves away from anvil 11. With this movement, spindle body 3A, on which main scale 31 is provided, is allowed to move into inner sleeve 15.

Thus, in accordance with the first embodiment, spindle body 3A, on which main scale 31 is provided, can be inserted into inner sleeve 15. By thus providing main scale 31 in close proximity to spindle body 3, the offset amount of main scale 31 with respect to spindle body 3A can be diminished. Thus, an improvement in theoretical measuring accuracy can be expected due to Abbe's principle. Further, the essential components, such as spindle 3, U-shaped main frame 3 and thimble 17, are not different from those of the conventional micrometer. This means the micrometer gauge of this embodiment can be used by machinists used to the conventional micrometer gauge without causing them to experience any unfamiliarity.

FIGS. 11 through 15 illustrate the second embodiment of the present invention. The difference between the first and second embodiments lies in the structure of the constant pressing device.

A spindle driving mechanism 105 comprises stopper 12, engagement member 13, and an engagement member driving mechanism 114 for causing engagement member 13 to advance and retreat along the axial direction of spindle 3. Engagement member driving mechanism 114 comprises inner sleeve 15, an outer sleeve 160, thimble 17, two plate springs 118, and one coil spring 119. Springs 118 and 119 are arranged between thimble 17 and outer sleeve 160. When thimble 17 is rotated in one direction, the torque of this rotation is transmitted to spindle 3 through plate springs 118, coil spring 119, spiral groove 16A of outer sleeve 160, and engagement member 13 to thereby cause spindle 3 to advance. Rotation of thimble 17 in the other direction causes spindle 3 to retreat.

In the second embodiment, ratchet wheel 17A, plate springs 118, and coil spring 119 constitute a constant pressing device 125. The structure of constant pressing device 125 is shown in detail in FIGS. 12 through 15.

Figure 15:
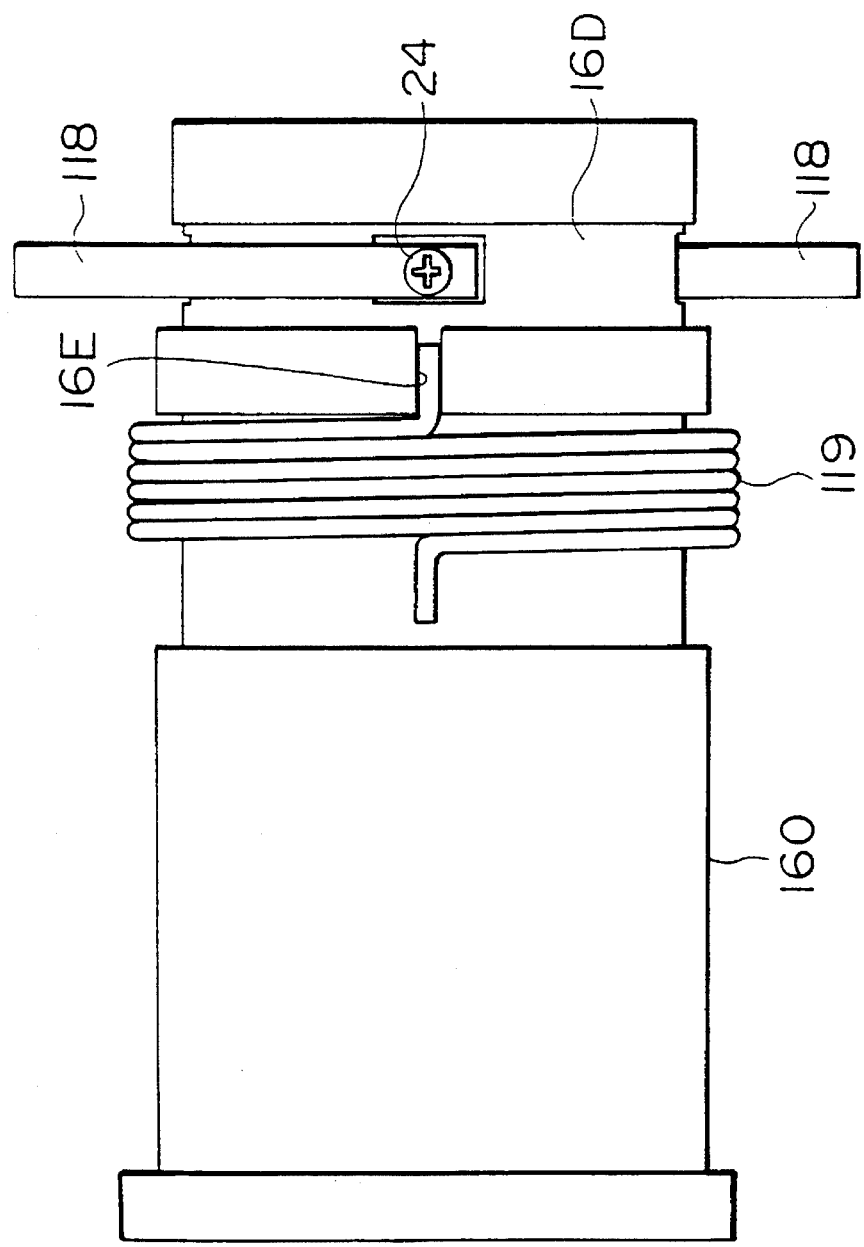
FIG. 15 is an enlarged front view of the outer sleeve of the gauge of the second embodiment.

In the drawings, coil spring 119 is mounted to leave a gap between it and the outer peripheral section of outer sleeve 160. As seen in FIG. 15, one end of coil spring 119 is engaged with an engagement groove 16E of outer sleeve 160 and fastened thereto, and the other end thereof is not fastened. The outer sidle surface of the cylindrical body of coil spring 119 presses against the inner surface of thimble 17. When thimble 17 is rotated in the direction to cause spindle 3 to move toward anvil 11, a force inclined to inwardly wind up coil spring 119 is generated. Thus, when spindle 3 meets with a strong resistance and a force larger than needed for winding up coil spring 119 is applied to thimble 17, coil spring 119 is wound up and torque ceases to be transmitted to outer sleeve 160, thereby causing thimble 17 to race. Thus, by appropriately selecting the material, etc. of coil spring 119, it is possible to set the measuring force at the time of measurement at a desired value. Conversely, when thimble 17 is rotated in the direction to cause spindle 3 to move away from anvil 11, a force inclined to outwardly expand coil spring 119 is generated to integrally unite thimble 17 and outer sleeve 16 with each other. So, spindle 3 can be moved with a strong force.

Generally speaking, plate springs 118 are provided solely for the purpose of indicating the racing of thimble 17 relative to outer sleeve 160 through the clicking sound generated by the tips of these plate springs when they intermittently hit against ratchet wheel 17B. The resilient force of these plate springs is set to be relatively weak. Thus, the width dimension of ratchet wheel 17B is smaller than that of ratchet wheel 17A of the first embodiment to conform with the width of plate springs 118. Further, the pitch of ratchet wheel 17B of the second embodiment is smaller than that of ratchet wheel 17A of the first embodiment.

The operation of the second embodiment is substantially the same as that of the first embodiment. However, the operation of constant pressing device 125 differs from that of the first embodiment. That is, when thimble 17 is rotated with one end of spindle 3 abutting against the workpiece to be measured, a torque larger than the force needed for the above-mentioned winding up is applied between outer sleeve 160 and thimble 17, and coil spring 119 is inwardly wound up. This results in thimble 17 racing with respect to outer sleeve 160. This racing of thimble 17 causes plate springs 118 to hit against ratchet wheel 17B to intermittently generate a clicking sound as they repeatedly bend and stretch. The interval of the clicks is shorter than in the first embodiment, so that the operator is made aware of the racing of the thimble more quickly and reliably than in the first embodiment.

The present invention is not restricted to the constructions of the above-described embodiments, but covers various modifications.

Figure 16:
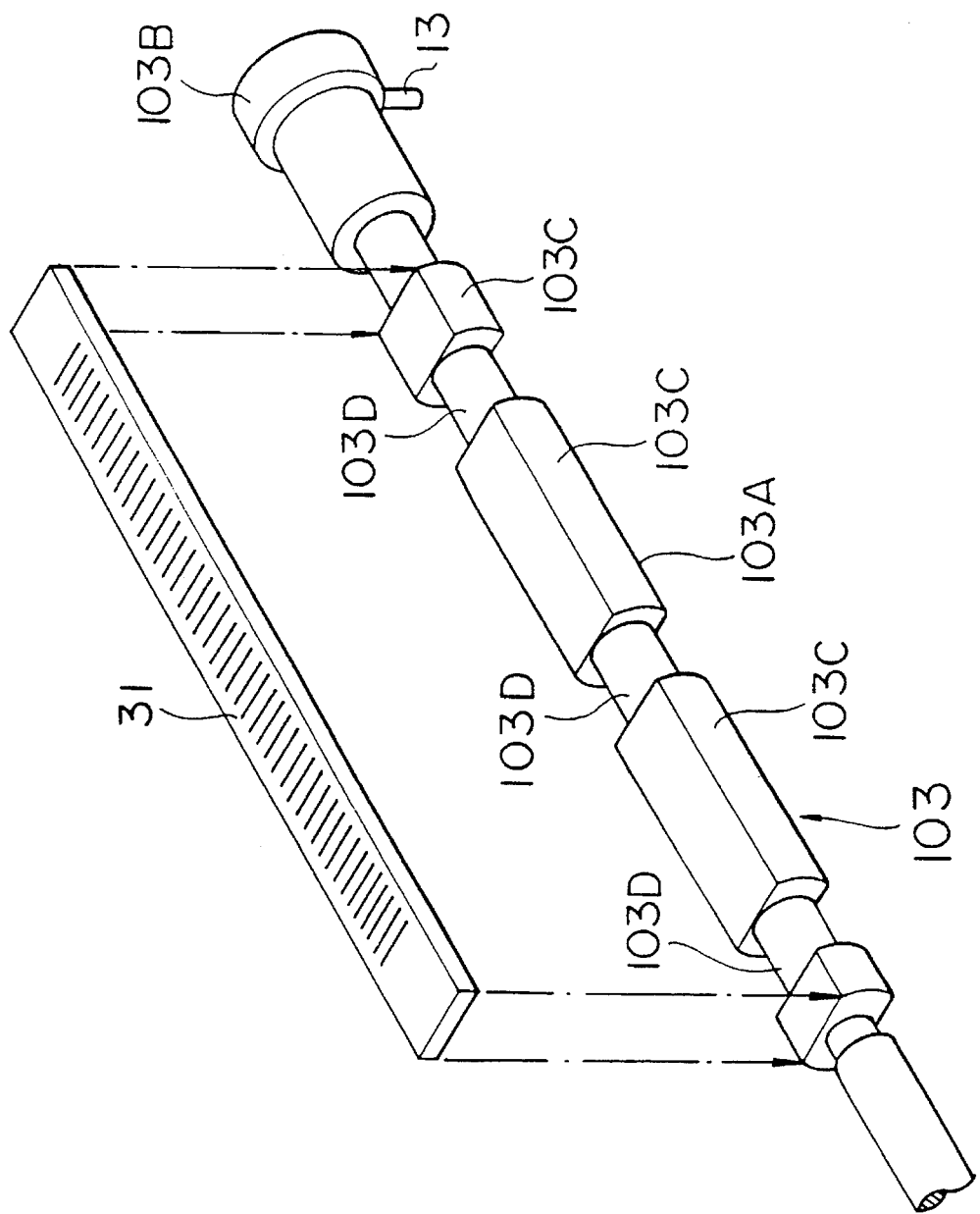
FIG. 16 is a perspective view of a spindle to be mounted in a gauge according to another embodiment of the present invention, with a main scale attached to the spindle.
Figure 17:
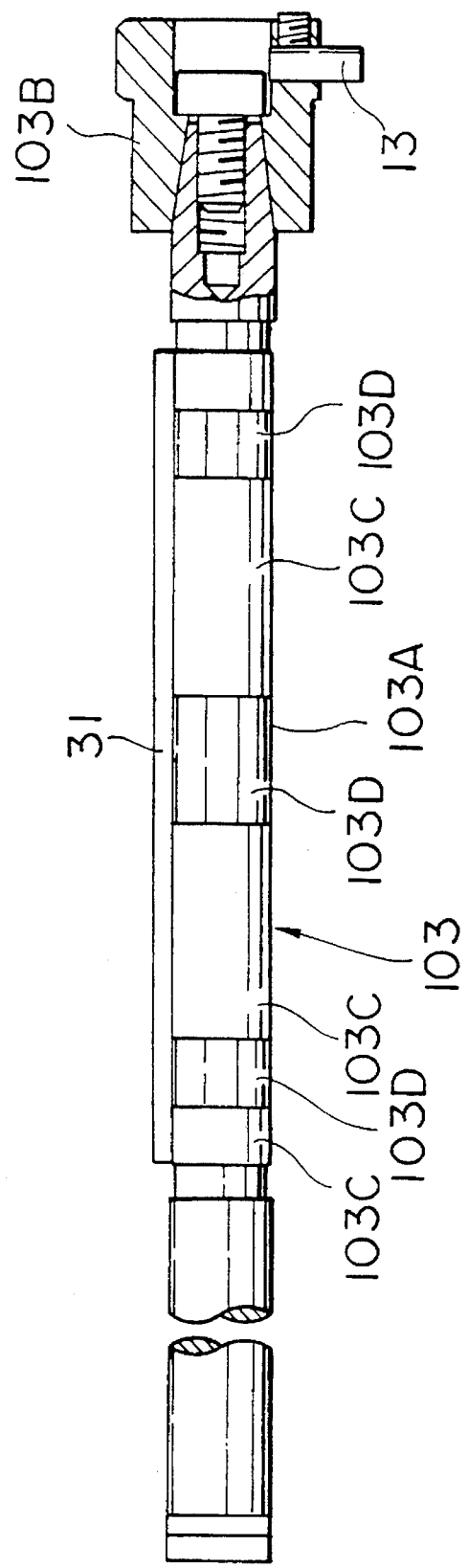
FIG. 17 is a partial front view in partial section of the spindle shown in FIG. 16.

For example, while in the above embodiments main scale 31 is attached to spindle 3 through the intermediation of scale mounting member 30, it is also possible to adopt a structure in which the main scale 31 is directly attached to a spindle body 103A of a spindle 103, as shown in FIGS. 16 and 17. Spindle body 103A is formed of a cylindrical member having a plurality of large-diameter and small-diameter sections 103C and 103D, which are alternately arranged. Large-diameter sections 103C are partly cut off on both sides of the axis of this cylindrical member, and the resulting flat, truncated sections have a thickness that is equal to the diameter of small-diameter sections 103D. Adhesive is applied to small-diameter sections 103D of spindle body 103A and to the back surface of main scale 31 so that the entire main scale 31 may be attached to spindle body 103A.

Further, stopper 12 and holding mechanism 23, provided in the above embodiments, may be omitted, as shown in FIGS. 16 and 17. Instead, engagement member 13 may be directly provided on a slide member 103B of spindle 103. The principal objects of the present invention can also be achieved with such a structure. Omission of stopper 12 and holding mechanism 23 leads to a reduction in the number of parts and facilitates the assembly work. In this case, the measuring pressure of spindle 3 can be adjusted by appropriately varying the screw pitch of the constant pressing device 25, 125 and spiral groove 16A of outer sleeve 16. That is, by increasing the screw pitch, the displacement amount of the spindle per thimble rotation increases, and the measuring pressure of spindle 3 decreases. On the other hand, by reducing the screw pitch, the measuring pressure of spindle 3 per thimble rotation increases. Thus, by forming spiral groove 16A such that its screw pitch gradually increases as spindle 3 approaches anvil 11, it is possible for the measuring pressure to decrease in proportion the distance between spindle 3 and anvil 11. The constant pressing mechanism for keeping the measuring force constant is not essential to the present invention, so it may also be omitted.

While in the above embodiments only one spiral groove 16A is formed in outer sleeve 16, it is also possible to form a plurality of such spiral grooves. In this case, stopper 12 and holding mechanism 23 are not provided, and engagement members 13 are arranged in slide member 103B of spindle 103 such that they respectively engage with the plurality of spiral grooves. This arrangement makes it possible to reduce the load per engagement member 13, thereby improving the durability of the gauge.

What is claimed is:

1. A digital display micrometer gauge comprising:

a U-shaped main frame having an anvil;

a spindle having a longitudinal axis and first and second ends, said first end coupled to said main frame for axial displacement relative to said main frame and said second end adapted to abut against said anvil upon displacement;

an engagement member provided at said first end of said spindle and radially protruding from said spindle;

an inner sleeve coupled to said main frame and having an outer periphery, an inner surface, and a slit therein extending in a direction parallel to said axis of said spindle, wherein said engagement member is slidably engaged with said slit;

an outer sleeve concentrically secured around said outer periphery of said inner sleeve to be circumferentially rotatable, said outer sleeve having an inner side with a spiral groove that engages with said engagement member;

a slide member provided at said first end of said spindle in sliding contact with said inner surface of said inner sleeve near said engagement member to support said spindle;

a linear encoder that detects and outputs a displacement amount of said spindle comprising a main scale attached to said spindle extending along said axis of said spindle so that said main scale is insertable into said inner sleeve during displacement of said spindle, and an index scale provided on said main frame opposed to said main scale, wherein said linear encoder detects the displacement amount of said spindle from a relative displacement amount between said main scale and said index scale;

a gap control mechanism that controls a gap between said main scale and said index scale; and a display coupled to said linear encoder that displays the output of said linear encoder in digital form.

2. The digital display micrometer gauge according to claim 1, wherein said linear encoder is a capacitive type linear encoder.

3. The digital display micrometer gauge according to claim 1, wherein aid linear encoder is an optical type linear encoder.

4. The digital display micrometer gauge according to claim 1, further comprising:

a rotating member supported by said slide member and having a side surface, wherein said engagement member is coupled to said rotating member and extends radially outward with respect to said axis of said spindle from said rotating member at a position opposed from said side surface, said rotating member being rotatable around an axis perpendicular to said axis of said spindle and perpendicular to said engagement member; and a holding mechanism selectively biasing said rotating member in a predetermined position but allowing said rotating member to rotate until said side surface thereof abuts against said inner surface of said inner sleeve when a force larger than a predetermined pressing force directed toward said anvil is applied to said engagement member.

5. The digital display micrometer gauge according to claim 1, wherein said gap control mechanism includes a plurality of protrusions provided adjacent at least one of said main scale and said index scale, and a biasing mechanism provided on said main frame that exerts a biasing force toward said main scale and said index scale.

6. The digital display micrometer gauge according to claim 5, wherein said plurality of protrusions comprises three protrusions and said biasing mechanism has a biasing center positioned at the center of gravity of a triangle defined by said three protrusions.

7. The digital display micrometer gauge according to claim 1, wherein said outer sleeve has an outer periphery; and further comprising a thimble having an inner peripheral circumferential section fitted onto said outer periphery of said outer sleeve and being circumferentially rotatable thereon; and a constant pressing mechanism arranged between said thimble and said outer sleeve that causes said thimble to race with respect to said outer sleeve when a torque in excess of a certain level is applied to said thimble.

8. A digital display micrometer gauge according to claim 7, wherein said constant pressing mechanism comprises a coil spring arranged between said outer sleeve and said thimble, and wherein said coil spring has a cylindrical outer side surface that presses against said thimble, with one end of said coil spring being secured to said outer sleeve.

9. A digital display micrometer gauge according to claim 7, wherein said thimble has a ratchet wheel formed in said inner peripheral circumferential section of said thimble, and wherein said constant pressing mechanism comprises a coil spring and plate springs arranged between said outer periphery of said outer sleeve and said inner peripheral circumferential section of said thimble, wherein said coil spring has a cylindrical outer side surface that presses against said inner peripheral circumferential section of said thimble, with one end of said coil spring secured to said outer sleeve, and wherein one end of each of said plate springs is secured to said outer sleeve, with the other end thereof abutting against said ratchet wheel formed in said inner peripheral section of said thimble.

10. The digital display micrometer gauge according to claim 7, wherein said thimble comprises a ratchet wheel formed in said inner peripheral section of said thimble, and wherein said constant pressing mechanism includes plate springs, each having two ends, one end attached to said outer peripheral section of said outer sleeve and the other end abutting against said ratchet wheel, and wherein cutout sections are formed in said outer peripheral section of said outer sleeve, an edge of each of said cutout sections serving as a bending fulcrum against which a central portion of each of said plate springs abuts when said thimble races with respect to said outer sleeve to thereby cause said plate springs to bend.

11. The digital display micrometer gauge according to claim 1, further comprising:

a cover secured to an end of said inner sleeve to close said inner sleeve, and a porous member attached to said cover that allows transmission of gas but not of liquid and solid between an interior of said inner sleeve and atmospheric air.

12. A micrometer gauge for measuring a workpiece comprising:

a frame defining a workpiece holding opening with an anvil coupled to the frame adjacent the opening for abutting the workpiece disposed in the opening;

a spindle axially movably supported by the frame to project toward and retract from the anvil within the opening, wherein the spindle and the anvil clamp the workpiece within the opening during measurement;

a spindle driving mechanism coupled to the spindle and the frame that selectively axially moves the spindle within the opening;

a position transducer directly coupled to the spindle to detect and output axial displacement of the spindle within the opening, wherein the position transducer projects and retracts with the spindle during displacement, wherein the position transducer comprises a main scale fixed to the spindle and an index scale secured to the frame, and wherein the displacement of the spindle is detected from relative displacement between the main scale and the index scale, the position transducer further comprising a gap control mechanism coupled to the frame adjacent the index scale and the main scale to bias the index scale and the main scale against each other; and a display positioned on the frame and coupled to the position transducer that displays the output of the position transducer.

13. The micrometer gauge of claim 12, wherein the frame has a U-shaped portion formed by two outwardly extending opposed ends, the ends defining the workpiece holding opening, wherein the anvil is disposed at one end and the spindle is movably disposed at the other end.

14. The micrometer gauge of claim 12, wherein the spindle comprises a spindle body having a side surface and a slide member coupled to the spindle body, wherein the slide member slidingly engages the frame.

15. The micrometer gauge of claim 14, wherein the position transducer is fixed to the side surface of the spindle.

16. The micrometer gauge of claim 14, wherein the position transducer is bonded to the side surface of the spindle.

17. The micrometer gauge of claim 14, further comprising a hollow mounting section having an exterior mounting side, wherein the position transducer is fixed to the exterior mounting side and the spindle is secured within the hollow mounting section and extends therethrough.

18. The micrometer gauge of claim 12, wherein the position transducer is a capacitive linear encoder.

19. The micrometer gauge of claim 12, wherein the gap control mechanism includes a first mounting member having three spaced protrusions defining vertices of a triangle facing the main scale and the index scale and a second mounting member comprising a plate spring, wherein the first and second mounting members are secured together and the plate spring of the second mounting member applies a force to the first mounting member that is uniformly transferred through the triangularly positioned protrusions to the index scale and the main scale.

20. The micrometer gauge of claim 12, wherein the spindle driving mechanism comprises:

an engagement member coupled to the spindle and projecting radially therefrom;

an inner sleeve having an axial slit therein fixedly secured to the frame;

an outer sleeve having a spiral groove therein rotatably secured around the inner sleeve; and a thimble coupled to the outer sleeve to selectively rotate the outer sleeve, wherein the engagement member is slidingly received in the axial slit in the inner sleeve and in the spiral groove in the outer sleeve, whereby rotation of the thimble selectively causes the spindle to move axially.

21. The micrometer gauge of claim 20, wherein rotation of the thimble selectively retracts the spindle and the main scale into the inner sleeve.

22. The micrometer gauge of claim 20, wherein the thimble comprises an inner peripheral section having a ratchet wheel formed therein, and wherein at least one plate spring having two ends is disposed between the outer sleeve and the thimble, wherein one end of the plate spring is secured to the outer sleeve and the other end is slidably engaged with the ratchet wheel to allow the thimble to race when a predetermined torque is applied to the thimble.

23. The micrometer gauge of claim 20, wherein the thimble comprises an inner peripheral section having a ratchet wheel formed therein, and wherein a coil spring and at least one plate spring having two ends are disposed between the outer sleeve and the thimble, wherein the coil spring has one end secured to the outer sleeve and has an outer side surface that presses against the inner peripheral section of the thimble that allows the thimble to race when a predetermined torque is applied to the thimble, and wherein one end of the plate spring is secured to the outer sleeve and the other end is slidably engaged with the ratchet wheel and clicks against the ratchet wheel when the thimble is racing.

24. The micrometer gauge of claim 20, further comprising a stopper pivotally secured to the spindle and slidable within the inner sleeve that stops axial movement of the spindle when a force generated by the spindle moving mechanism exceeds a predetermined limit.

25. The micrometer gauge of claim 24, wherein the stopper is pivotally secured to the spindle about a radial axis with respect to the spindle and has an outer edge that engages the inner sleeve to stop axial movement of the spindle upon pivoting of the stopper.

26. The micrometer gauge of claim 25, further comprising a spring coupled between the stopper and the spindle to bias the stopper into a non-engagement position.

27. The micrometer gauge of claim 20, further comprising an end cap secured to the inner sleeve having a gas permeable closure.

28. The micrometer gauge of claim 12, further comprising a stopper pivotally secured to the spindle in the frame that stops axial movement of the spindle when a force generated by the spindle moving mechanism exceeds a predetermined limit.

29. The micrometer gauge of claim 12, wherein the display is digital.

30. The micrometer gauge of claim 12, wherein the position transducer is an optical type linear encoder.

* * * * *